United States Patent
Huang

(10) Patent No.: US 7,543,315 B2
(45) Date of Patent: Jun. 2, 2009

(54) DISK-CLAMPING DEVICE PROVIDING LITTLE NOISE DURING THE DISK CLAMPING OPERATION IN A DISK DRIVE

(75) Inventor: Fu Huang, Su Chou (CN)

(73) Assignee: Qisda Corporation, Taoyuan County (TW)

( * ) Notice: Subject to any disclaimer, the term of this patent is extended or adjusted under 35 U.S.C. 154(b) by 502 days.

(21) Appl. No.: 11/333,059

(22) Filed: Jan. 17, 2006

(65) Prior Publication Data
US 2006/0168608 A1  Jul. 27, 2006

(30) Foreign Application Priority Data
Jan. 25, 2005  (TW) .............................. 94102182 A

(51) Int. Cl.
*G11B 17/028* (2006.01)
*G11B 19/20* (2006.01)
*G11B 17/03* (2006.01)

(52) U.S. Cl. ..................................................... 720/706
(58) Field of Classification Search .......... 720/706–716
See application file for complete search history.

(56) References Cited

U.S. PATENT DOCUMENTS

| 4,541,086 A * | 9/1985 | Tanaka ........................ 720/711 |
| 2004/0111737 A1* | 6/2004 | Masaki et al. ................ 720/715 |

FOREIGN PATENT DOCUMENTS

DE  4243972 A1 *  7/1993

* cited by examiner

*Primary Examiner*—William J Klimowicz

(57) ABSTRACT

A disk-clamping device for a disk drive includes a mounting seat and a clamp member disposed above the mounting seat. Each of the mounting seat and the clamp member has a clamping plate. A resilient projection structure is disposed between the clamping plates of the mounting seat and the clamp member in such a manner that the projection structure collides against one of the clamping plates in order to reduce the noise generating due to collision between the clamping plates during the disk clamping operation of the disk drive.

20 Claims, 5 Drawing Sheets

DISK-CLAMPING DEVICE PROVIDING LITTLE NOISE DURING THE DISK CLAMPING OPERATION IN A DISK DRIVE

FIELD OF THE INVENTION

The invention relates to a disk-clamping device, more particularly to a disk-clamping device for a disk drive. The disk-clamping device has a specific structure to provide little noise during the disk clamping operation in the disk drive.

BACKGROUND OF THE INVENTION

Referring to FIG. 1, a conventional disk-clamping device 11 is shown for clamping a disk 20 in a disk drive 10, and includes a mounting seat 14 and a clamp member 12 disposed above the mounting seat 14.

As illustrated, the disk drive 10 usually includes a disk tray (not shown) that receives the disk 20 thereon and that withdraws into the disk drive 10 in order to retain the disk 20 within the disk drive 10, and a spindle motor 16 coupled to the mounting seat 14 for rotating the disk 20 once the disk tray (not shown) is withdrawn into the disk drive 10 and once the disk 20 is moved vertically upward by virtue of movement of the spindle motor 16 together with the mounting seat 14, thereby raising the disk 20 above the disk tray so as to sandwich the disk 20 between the mounting seat 14 and the clamp member 11.

In the aforesaid conventional disk-clamping device 11, an undesired noise is generated during the clamping operation of the disk 20 since the mounting seat 14 and the clamp member 32 are made from metal materials. After the withdrawal of the disk tray into the disk drive and in case of absence of the disk therein, one can observably notice the noise generated due to direct collision between the mounting seat 14 and the clamp member 12.

In order to eliminate the abovementioned noise, a portion or some parts of the mounting seat 14 and the clamp member 12 can be constructed with rubber materials so as to lower the amplitude of noise during the electromagnetic attraction between the mounting seat 14 and the clamp member 12. Alternatively, the contacting surfaces of the mounting seat 14 and the clamp member 12 are respectively coated with rubber cushions so as to lower the amplitude of noise. However, altering the constructing material of the mounting seat 14 and the clamp member 12 or application of the rubber cushions provides limited improvement in the noise lowering process of the conventional disk-clamping device 11.

SUMMARY OF THE INVENTION

The main object of the present invention is to provide a disk-clamping device for a disk drive. The disk-clamping device has a specific structure that lowers the noise generated during collision of the mounting seat and the clamp member by virtue of the electromagnetic field generated therebetween.

In one aspect of the present invention, a disk-clamping device is provided for clamping a disk disposed within a disk drive that includes a spindle motor, the disk being formed a central through hole, the spindle motor being coupled to the disk-clamping device in order to rotate the disk in cooperation with the disk-clamping device. The disk-clamping device accordingly includes: a mounting seat including a first clamping plate and a protrusive element projecting upwardly from a center of the first clamping plate to permit sleeving of the through hole around the protrusive element for seating the disk onto the first clamping plate; a clamp member disposed above the mounting seat, and including a second clamping plate having a bottom surface and a central recess that extends inwardly from the bottom surface and that is defined by a recess-confining wall having a upper wall surface confining an upper side of the central recess, the second clamping plate further defining an imaginary line intersecting the central recess into a first half and a second half symmetric to the first half; and a first projection structure disposed on the upper wall surface in the first half of the central recess in the second clamping plate. During the clamping operation of the mounting seat and the clamp member in order to sandwich the disk between the first and second clamping plates, extension of the protrusive element into the central recess in the clamp member results in collision of the protrusive element against the first projection structure prior to the protrusion element against the upper wall surface of the central recess, thereby lowering a noise generated due to collision between the upper wall surface of the central recess against the protrusive element.

In second aspect of the present invention, a disk-clamping device is provided for clamping a disk disposed within a disk drive that includes a spindle motor, the disk being formed a central through hole, the spindle motor being coupled to the disk-clamping device in order to rotate the disk in cooperation with the disk-clamping device. The disk-clamping device includes: a mounting seat including a first clamping plate and a protrusive element projecting upwardly from a center of the first clamping plate to permit sleeving of the through hole of the disk around the protrusive element for seating the disk onto the first clamping plate, the first clamping plate further defining an imaginary line intersecting the protrusive element into a first half and a second half symmetric to the first half, the protrusive element having an upper wall surface; a clamp member disposed above the mounting seat, and including a second clamping plate having a bottom surface and a central recess that extends inwardly from the bottom surface and that is defined by a recess-confining wall having an upper wall surface confining an upper side of the central recess; and a first projection structure disposed on the upper wall surface in the first half of the protrusive element. During the clamping operation of the mounting seat and the clamp member in order to sandwich the disk between the first and second clamping plates, extension of the protrusive element into the central recess in the clamp member results in collision of the first projection structure against the upper wall surface in the central recess prior to the upper wall surface of the protrusion element against the upper wall surface in the central recess, thereby lowering a noise generated due to collision between the upper wall surfaces of the central recess and the protrusive element.

In a third aspect of the present invention, a disk-clamping device is provided for a disk drive. The disk-clamping device includes: a mounting seat including a first clamping plate and a protrusive element projecting upwardly from a center of the first clamping plate; a clamp member disposed above the mounting seat, and including a second clamping plate having a bottom surface and a central recess that extends inwardly from the bottom surface and that is defined by a recess-confining wall having a upper wall surface confining an upper side of the central recess, the second clamping plate further defining an imaginary line intersecting the central recess into a first half and a second half symmetric to the first half; and a first projection structure disposed on the upper wall surface in the first half of the central recess in the second clamping plate. During the clamping operation of the mounting seat and the clamp member, extension of the protrusive element into the central recess in the clamp member results in collision of the protrusion element against the first projection structure prior to the protrusion element against the upper wall surface of the central recess, thereby lowering a noise generated due to collision between the upper wall surface of the central recess against the protrusive element.

BRIEF DESCRIPTION OF THE DRAWING

Other features and advantages of this invention will become more apparent in the following detailed description of the preferred embodiments according to this invention, with reference to the accompanying drawings, in which.

DETAILED DESCRIPTIONS OF THE PREFERRED EMBODIMENTS

Figure 1:
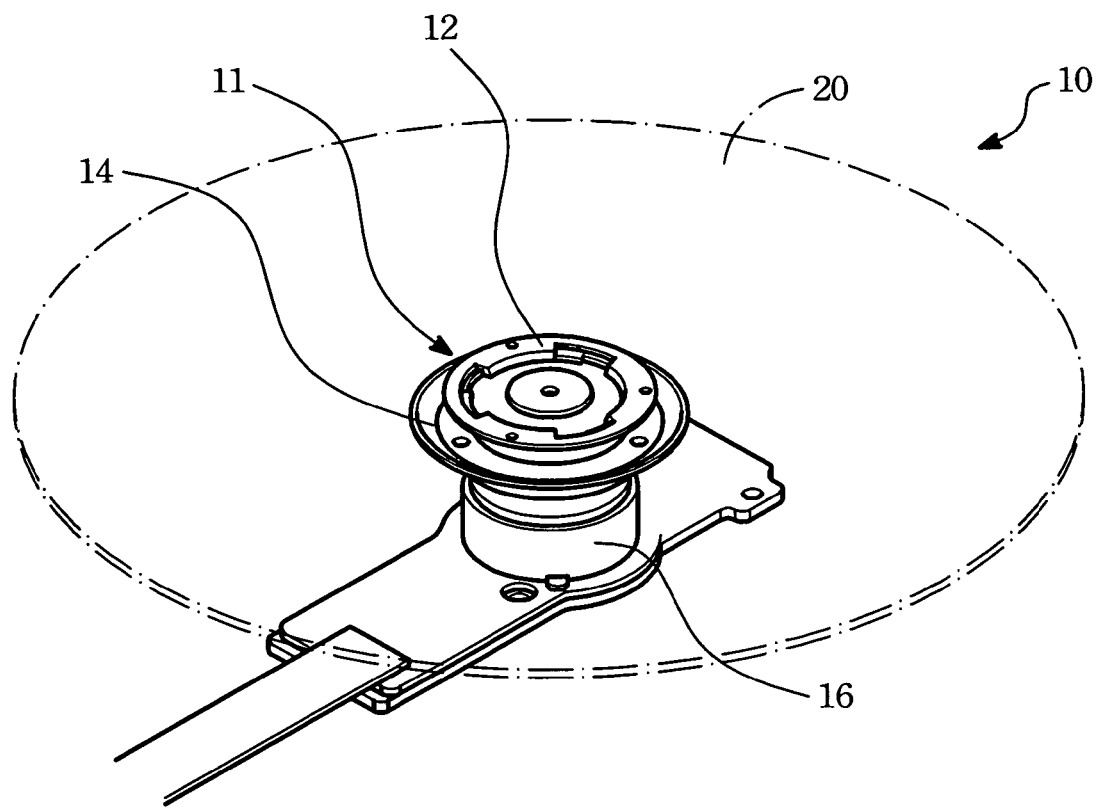
FIG. 1 is a perspective view of a conventional disk-clamping device in a disk drive.
Figure 2:
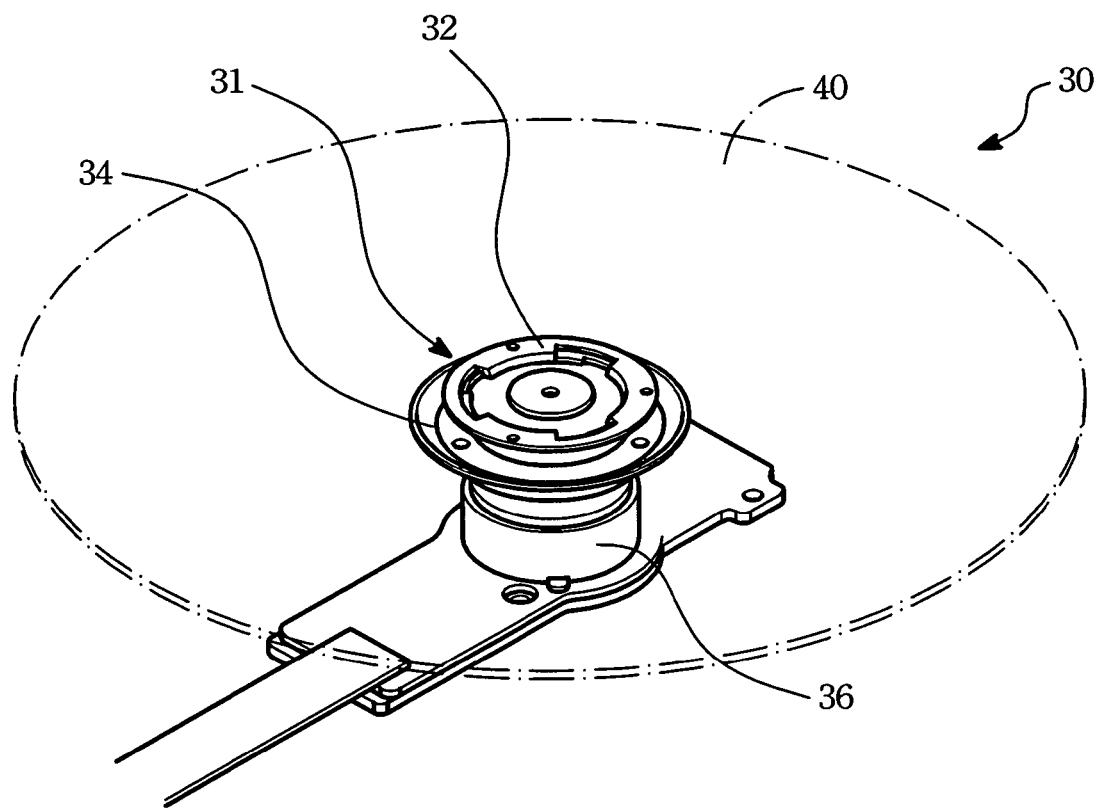
FIG. 2 is a perspective view of the first embodiment of a disk-clamping device in a disk drive according to the present invention.

Referring to FIG. 2, a perspective view of the first embodiment 31 of a disk-clamping device according to the present invention is provided for clamping a disk 40 disposed within a disk drive 30 that includes a spindle motor 36. The first embodiment includes a mounting seat 34 and a clamp member 32.

Figure 3A:
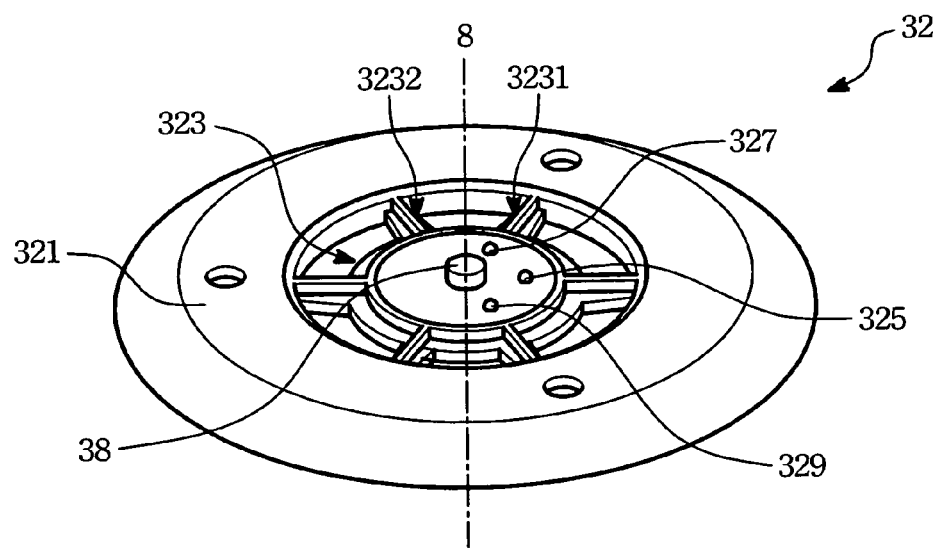
FIG. 3A shows a perspective view of the clamp member employed in the first embodiment of the disk-clamping device according to the present invention, wherein the clamp member is turned upside down in order to illustrate the configuration of a bottom surface thereof.
Figure 3B:
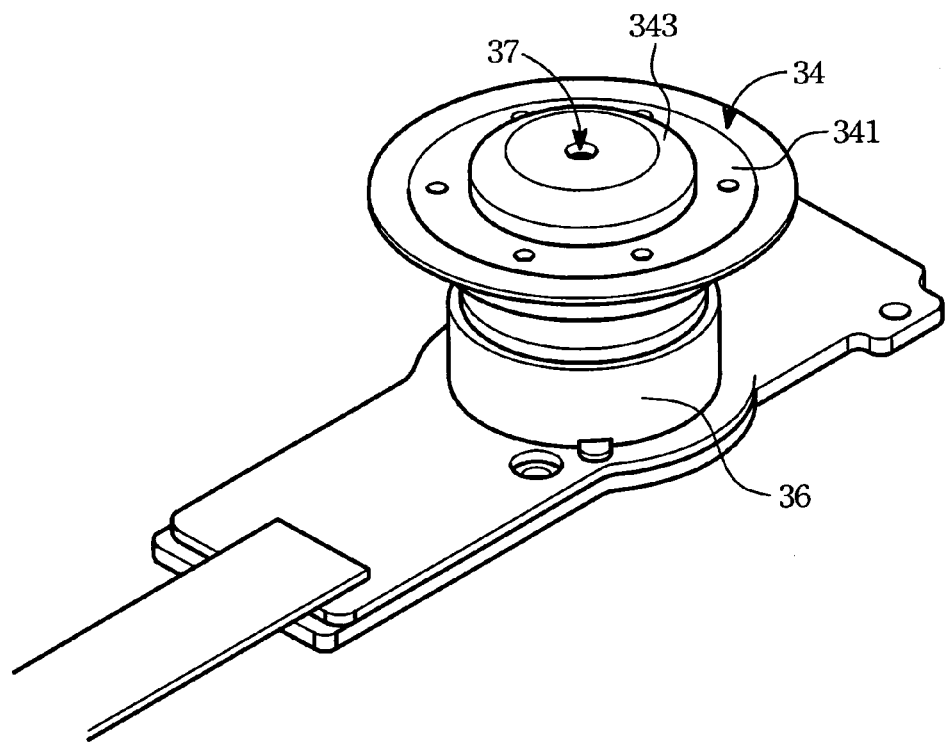
FIG. 3B shows a perspective view of the mounting seat employed in the first embodiment of the disk-clamping device according to the present invention.
Figure 4A:
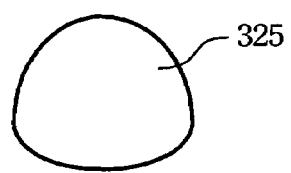
FIGS. 4A, 4B, 4C, 4D, 4E and 4F respectively show a perspective view of a projection structure employed in the first embodiment of the disk-clamping device according to the present invention.
Figure 4B:
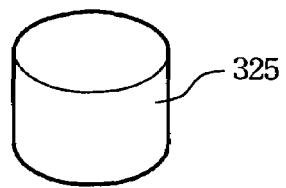
Figure 4C:
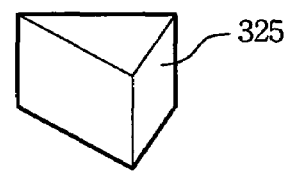
Figure 4D:
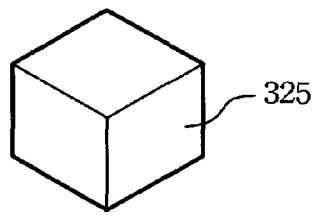
Figure 4E:
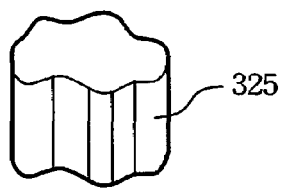
Figure 4F:
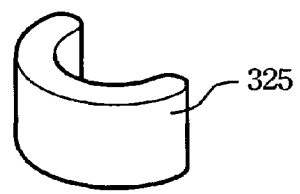

Referring to FIGS. 3B, a perspective view of the mounting seat 34 is shown and coupled to the spindle motor 36 in such a manner that the latter rotates the disk 40 (see FIG. 2) once the disk 40 is drawn into the disk drive 30. The mounting seat 34 includes a first clamping plate 341 and a cylindrical protrusive element 343 projecting upwardly from a center of the first clamping plate 341 to permit sleeving of the through hole in the disk 40 around the protrusive element 343 for seating the disk 40 onto the first clamping plate 341. Since coupling of the mounting seat 34 to the spindle motor 36 and how the spindle motor 36 rotates the disk are not the relevant feature of the present invention, a detailed description of the same is omitted herein for the sake of brevity.

Referring to FIG. 3A, a perspective view of the clamp member 32 is shown in upside down view in order to illustrate the bottom surface thereof. The clamp member 32 is disposed above the mounting seat 34, and includes a second clamping plate 321 having a bottom surface and a central recess 323 that extends inwardly from the bottom surface and that is defined by a recess-confining wall having an upper wall surface confining an upper side of the central recess 323. The second clamping plate 321 further defines an imaginary line 8 intersecting the central recess 323 into a first half 3231 and a second half 3232 symmetric to the first half 3231. The first projection structure 325 is disposed on the upper wall surface in the first half 3231 of the central recess 323 in the second clamping plate 321. In this embodiment, second and third projection structures are disposed on the upper wall surface in the first half 3231 of the central recess 323 in the second clamping plate 321 such that the second and third structures 327, 329 are equally spaced from the first projection structure 325. The second projection structure 327 has a height the same as the first projection structure 325. Alternatively, the second projection structure 327 has a height shorter than that of the first projection structure 325. The third projection structure 329 has a height the same as that of the second projection structure 327. Alternatively, the third projection structure 329 has a height shorter than that of the second projection structure 327. Note that the first, second and third projection structures 325, 327, 329 are made from elastomeric materials, such as rubber or any other resilient substance so long as it provides resiliency. The height of each of the first, second and third projection structures 325, 327, 329 should not be limited. In addition, the configuration of the first, second and third projection structures 325, 327, 329 should not be limited either. As illustrated in FIGS. 4A, 4B, 4C, 4D, 4F and 4F, the projection structure 325 can be dome shape, cylindrical shape, triangular shape, polygonal shape, rectangular or sector shapes.

Referring again to FIGS. 3A and 3B, the protrusive element 343 of the mounting seat 34 is formed with a central positioning hole 37. The upper wall surface of the central recess 323 is formed with a retention post 38 extending into the positioning hole 37 in the protrusive element 343 in order to provide stable seating of the clamp member 32 on the mounting seat 34 such that during clamping operation of the mounting seat 34 and the clamp member 32 in order to sandwich the disk 40 between the first and second clamping plates 341, 321, extension of the protrusive element 343 into the central recess 323 in the clamp member 32 results in collision of the protrusion element 343 against the first, second and third projection structures 325, 327, 329 prior to the protrusion element 343 against the upper wall surface of the central recess 323, thereby lowering a noise generated due to collision between the upper wall surface of the central recess 323 against the protrusive element 343. As a matter of fact, collision of the protrusive element 343 against the projection structures 325, 327, 329 as well as the upper wall surface of the central recess 323 takes place successively with only a very tiny fraction of time interval therebetween. However provision of the projection structures 325, 327, 329 between the mounting seat 34 and the clamp member 32 greatly reduce the noise generating during the disk clamping operation or during the collision between the mounting seat 34 and the clamp member 32 in case of absence of the disk within the disk drive.

Figure 5A:
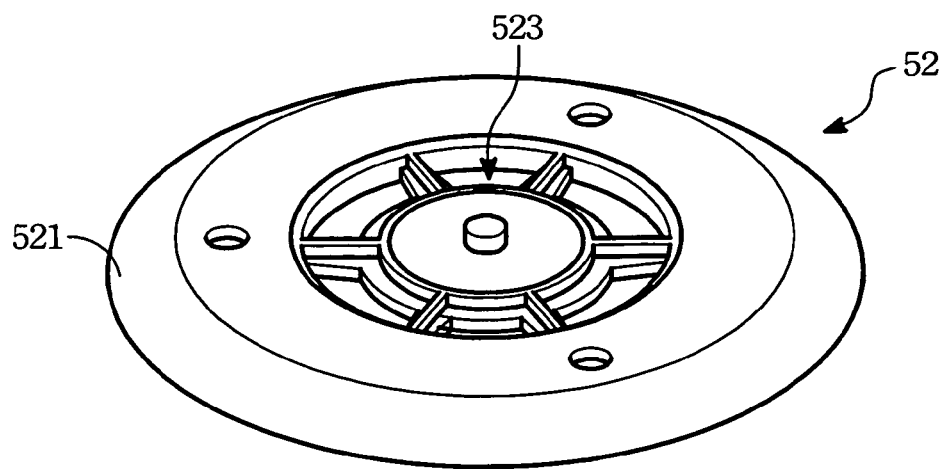
FIG. 5A shows a perspective view of the clamp member employed in the second embodiment of the disk-clamping device according to the present invention, wherein the clamp member is turned upside down in order to illustrate the configuration of a bottom surface thereof.
Figure 5B:
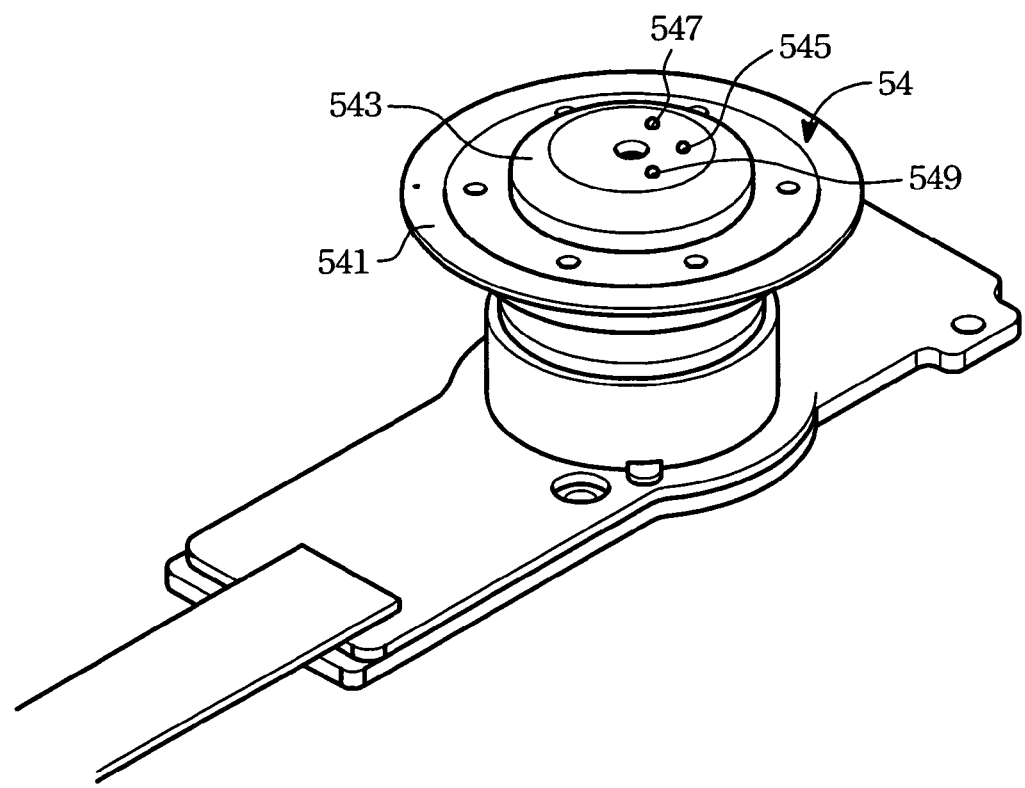
FIG. 5B shows a perspective view of the mounting seat employed in the second embodiment of the disk-clamping device according to the present invention.

Referring to FIGS. 5A and 5B, the second embodiment of the disk-clamping device for the disk drive according to the present invention is shown to have a construction similar to the first embodiment. The only difference resides in the first, second and third projection structures 545, 547, 549 are disposed on the upper wall surface of the protrusive element 543 in such a manner that during the clamping operation of the mounting seat 54 and the clamp member 52 in order to sandwich the disk (not shown) between the first and second clamping plates 541, 521, extension of the protrusive element 543 into the central recess 523 in the clamp member 32 results in collision of the first, second and third projection structures 545, 547, 549 against the upper wall surface in the central recess 523 prior to the upper wall surface of the protrusion element 543 against the upper wall surface in the central recess 523, thereby lowering the noise generated due to collision between the upper wall surfaces of the central recess 523 and the protrusive element 543.

While the present invention has been described in connection with what is considered the most practical and preferred embodiments, it is understood that this invention is not limited to the disclosed embodiments but is intended to cover various arrangements included within the spirit and scope of the broadest interpretation so as to encompass all such modifications and equivalent arrangements.

I claim:

1. A disk-clamping device for clamping a disk disposed within a disk drive that includes a spindle motor, the disk being formed with a central through hole, the spindle motor being coupled to the disk-clamping device in order to rotate the disk in cooperation with the disk-clamping device, the disk-clamping device comprising:
    a mounting seat including a first clamping plate and a protrusive element projecting upwardly from a center of said first clamping plate to permit sleeving of the through hole around said protrusive element for seating the disk onto said first clamping plate;
    a clamp member disposed above said mounting seat, and including a second clamping plate having a bottom surface and a central recess that extends inwardly from said bottom surface and that is defined by a recess-confining wall having an upper wall surface confining an upper side of said central recess, said second clamping plate further defining an imaginary line intersecting said central recess into a first half and a second half symmetric to said first half; and
    a first projection structure disposed on said upper wall surface in said first half of said central recess in said second clamping plate;
    whereby, during clamping operation of said mounting seat and said clamp member in order to sandwich the disk between the first and second clamping plates, extension of said protrusive element into said central recess in said clamp member results in collision of said protrusive element against said first projection structure prior to said protrusive element against said upper wall surface of said central recess, thereby lowering a noise generated due to collision between said upper wall surface of said central recess against said protrusive element.

2. The disk-clamping device according to claim 1, wherein said protrusive element of said mounting seat is formed with a central positioning hole, said upper wall surface of said central recess being formed with a retention post extending downwardly into said positioning hole in said protrusive element.

3. The disk-clamping device according to claim 1, further comprising a second projection structure disposed on said upper wall surface in said first half of said central recess in said second clamping plate.

4. The disk-clamping device according to claim 3, wherein said second projection structure has a height the same as said first projection structure.

5. The disk-clamping device according to claim 3, wherein said second projection structure has a height shorter than that of said first projection structure.

6. The disk-clamping device according to claim 5, further comprising a third projection structure disposed on said upper wall surface in said first half of said central recess in said second clamping plate.

7. The disk-clamping device according to claim 6, wherein said third projection structure has a height the same as that of said second projection structure.

8. The disk-clamping device according to claim 6, wherein said third projection structure has a height shorter than that of said second projection structure.

9. The disk-clamping device according to claim 1, wherein said first projection structure is selected from a group consisting of a dome-shaped, cylindrical shape, triangular shape, polygonal shape and rib projection.

10. The disk-clamping device according to claim 1, wherein said first projection structure is made from rubber material.

11. A disk-clamping device for clamping a disk disposed within a disk drive that includes a spindle motor, the disk being formed with a central through hole, the spindle motor being coupled to the disk-clamping device in order to rotate the disk in cooperation with the disk-clamping device, the disk-clamping device comprising:
    a mounting seat including a first clamping plate and a protrusive element projecting upwardly from a center of said first clamping plate to permit sleeving of the through hole of the disk around said protrusive element for seating the disk onto said first clamping plate, said first clamping plate further defining an imaginary line intersecting said protrusive element into a first half and a second half symmetric to said first half, said protrusive element having an upper wall surface;
    a clamp member disposed above said mounting seat, and including a second clamping plate having a bottom surface and a central recess at extends inwardly from said bottom surface and that is defined by a recess-confining wall having an upper wall surface confining an upper side of said central recess; and
    a first projection structure disposed on said upper wall surface in said first half of said protrusive element;
    whereby, during clamping operation of said mounting seat and said clamp member in order to sandwich the disk between the first and second clamping plates, extension of said protrusive element into said central recess in said clamp member results in collision of said first projection structure against said upper wall surface in said central recess prior to said upper wall surface of said protrusive element against said upper wall surface in said central recess, thereby lowering a noise generated due to collision between said upper wall surfaces of said central recess and said protrusive element.

12. The disk-clamping device according to claim 11, wherein said upper wall surface of said protrusive element of said mounting seat is formed with a central positioning hole, said upper wall surface of said central recess being formed with a retention post extending downwardly into said positioning hole in said protrusive element.

13. The disk-clamping device according to claim 11, further comprising a second projection structure disposed on said upper wall surface in said first half of said protrusive element.

14. The disk-clamping device according to claim 13, wherein said second projection structure has a height the same as said first projection structure.

15. The disk-clamping device according to claim 13, wherein said second projection structure has a height shorter than that of said first projection structure.

16. The disk-clamping device according to claim 15, further comprising a third projection structure disposed on said upper wall surface in said first half of said protrusive element.

17. The disk-clamping device according to claim 16, wherein said third projection structure has a height the same as that of said second projection structure.

18. The disk-clamping device according to claim 16, wherein said third projection structure has a height shorter than that of said second projection structure.

19. The disk-clamping device according to claim 11, wherein said first projection structure is selected from a group consisting of a dome-shaped, cylindrical shape, triangular shape, polygonal shape and rib projection.

20. A disk-clamping device for a disk drive, comprising:
  a mounting seat including a first clamping plate and a protrusive element projecting upwardly from a center of said first clamping plate;
  a clamp member disposed above said mounting seat, and including a second clamping plate having a bottom surface and a central recess that extends inwardly from said bottom surface and that is defined by a recess-confining wall having an upper wall surface confining an upper side of said central recess, said second clamping plate further defining an imaginary line intersecting said central recess into a first half and a second half symmetric to said first half; and
  a first projection structure disposed on said upper wall surface in said first half of said central recess in said second clamping plate;
  whereby, during clamping operation of said mounting seat and said clamp member, extension of said protrusive element into said central recess in said clamp member results in collision of said protrusive element against said first projection structure prior to said protrusive element against said upper wall surface of said central recess, thereby lowering a noise generated due to collision between said upper wall surface of said central recess against said protrusive element.

* * * * *